Dec. 17, 1968 M. P. PECHINI 3,416,957

RESISTANCE ELEMENT UTILIZING GROUP III OR V-B METAL

Filed May 10, 1965

*INVENTOR.*
MAGGIO P. PECHINI
*BY*
*Connolly and Hutz*
HIS ATTORNEYS

United States Patent Office 3,416,957

Patented Dec. 17, 1968

3,416,957

RESISTANCE ELEMENT UTILIZING GROUP III OR V-B METAL

Maggio P. Pechini, Williamstown, Mass., assignor to Sprague Electric Company, North Adams, Mass., a corporation of Massachusetts Filed May 10, 1965, Ser. No. 454,487
19 Claims. (Cl. 117—212)

ABSTRACT OF THE DISCLOSURE

Forming a resistance device by applying to the surface of a porous titanate body, a pattern of an organic solvent-soluble amorphous organometallic compound. Firing the body to cause decomposition of the organometallic compound to the metal oxide and cause the oxide to enter the titanate lattice. A resistance device such as that formed by this process is presented.

This invention is related to semiconducting elements having a high positive temperature coefficient (PTC) of resistance and to a process for producing the elements. This invention is concerned with ceramic $BaTiO_3$ and its solid solution with other constituents.

The resistivity of the dielectric material, ceramic $BaTiO_3$, which is normally of the order of $10^{12}$ ohm-cms., can be lowered to values in the range 10 to 1000 ohm-cm. by introducing small amounts (0.1 to 1.5 wt. percent) of an impurity cation into either the $Ba^{+2}$ or $Ti^{+4}$ sites of the $BaTiO_2$ lattice. The resulting N-type semiconductor is characterized by a large PTC of resistivity anomaly in the vicinity of the ferroelectric-paraelectric transition temperature, which is commonly referred to as the Curie point. For unmodified ceramic $BaTiO_3$, the Curie point is at about 120° C. This thermal sensitivity over a narrow temperature range makes this material uniquely suitable for thermistor devices.

Furthermore, the region of thermal sensitivity can be shifted over a broad temperature range by selection of the appropriate ferroelectric solid solution. An increasing lattice substitution of $Sr^{+2}$ for $Ba^{+2}$ in $BaTiO_3$, for example, lowers the Curie point and shifts the PTC resistivity anomaly to lower temperatures. This material is presently utilized in the manufacture of thermistors, fabricated as ceramic discs of uniform resistivity throughout, with metallic electrodes on opposite faces. The room temperature resistance value depends upon the physical dimensions of the disc and the concentration of impurity ions introduced to lower resistivity. Since the concentration of impurity ions must be kept within narrow limits to effect the optimum resistivity anomaly, it is difficult to fabricate thermistors without greatly changing the physical dimensions of the discs. Thus, for example, to produce a thermistor by the present state of the art, having a room temperature resistance value higher than 10K, it would be necessary to greatly increase the volume of the sensing element. This in turn would increase its thermal time constant and decrease its utility value for protective or control devices.

The number of applications for these thermistors can be greatly increased by printing the resistor on a nonconducting substrate. A range of resistive values can be obtained simply by changing the shape and size of the printed area. Thus, miniature thermistors can be fabricated with a wide range of resistance values. The planar surface thermistor permits better thermal coupling for surface temperature measurements and control. This improved thermal coupling combined with miniaturization results in a faster response and a more efficient thermal switch. A series of electrically isolated thermistors can be placed on, or more precisely in, a single wafer to serve separate circuits or to be combined externally to change resistance values. The printed thermistor can be made an integral part of a printed circuit, where it might serve as a low current or voltage limiter or as a temperature compensating resistor.

An object of this invention is to provide a process for producing ceramic bodies having one or more selected regions so altered in minor chemical constituents that these regions are of much lower resistivity than the remaining unaltered regions.

Another object of this invention is to produce planar thermistors characterized by a sharp increase in PTC of electrical resistance over a narrow temperature range.

Still another object of this invention is to produce PTC thermistors having a small sensing area or sensing areas yet operative at high values of electrical resistance.

Other objects and advantages of the present invention will be made obvious to those skilled in the art by the following description when considered in relation to the accompanying drawing of which:

In accordance with the present invention, the surface of a green or partially matured barium titanate body is made semiconducting by applying to the surface thereof a continuous film of an organic solvent-soluble, amorphous organometallic compound and then sintering the body to maturity. The titanate body must be green or partially matured so as to insure a porous body. The metal of said compound is selected from the group consisting of metals which form ions capable of entering substitutionally into a cation site of the barium titanate crystal lattice in a higher valency than the host ion. The resulting body is converted from a comparatively porous body to a dense ceramic which is essentially an insulator having a high dielectric constant except over the area that had been impregnated by the organometallic compound. This area is coplanar with the surface of the dielectric. As used herein the term coplanar means that at least one surface of the resistor lies in the same plane as at least one surface of the dielectric body so that the respective surfaces are in side by side relationship or so that one surface surrounds or partially surrounds the other in said plane. The blue coloration of the modified area is visual evidence that the area is electroconducting.

It is essential that the modifying metal be introduced via a continuous film of an amorphous organometallic compound. If a water-metal oxide dispersion is attempted, a nonadherent layer of the oxide tends to remain on the surface of the dielectric after evaporation of the water and that portion which does diffuse into the dielectric does so in uncontrolled concentrations which do not convert the dielectric to a semiconductor. Should a solution of water soluble salts be employed, the concentration increases during evaporation of the water and eventually crystallization begins with nucleation and isolation of the crystals. These are comparatively large crystals which generally will not diffuse into the body. The small amount which does diffuse, results in a grossly discontinuous distribution. Even if a colloidal suspension is employed, as the water evaporates the colloidal particles agglomerate and a controlled diffusion is impossible. Ineffective processes such as the foregoing, all seem to result in pockets of isolated oxide in the dielectric and consequent electrical discontinuity.

Figure 1:
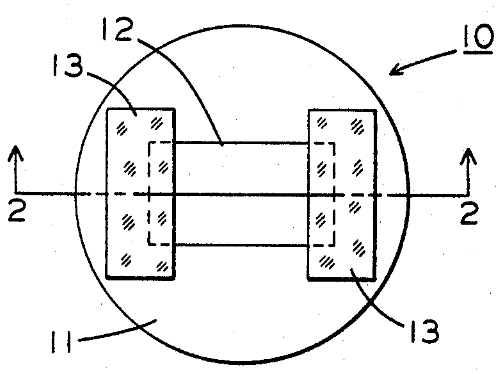
FIGURE 1 is a plan view of a thermistor of the present invention.
Figure 2:
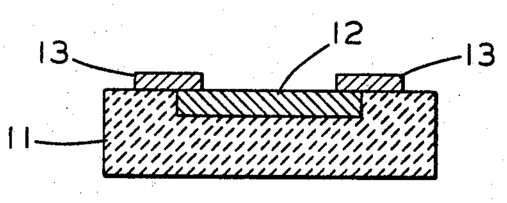
FIGURE 2 is a side view in section of the unit of FIGURE 1.

Referring to FIGURES 1 and 2 of the drawing, a thermistor 10 comprises a dielectric ceramic titanate disc 11 having a resistor zone 12 and a pair of electrodes 13.

EXAMPLE 1

$BaTiO_3$ formed by calcining barium titanium citrate at 800° C., was compacted at 50,000 p.s.i. into a disc about 1 cm. in diameter and 0.05 cm. thick without the aid of a binder. A solution containing the equivalent of $9\times10^{-4}$ grams of lanthanum per milliliter was brushed across the surface of the disc. The solution was prepared by dissolving $La_2O_3$ in a titanium citrate-ethylene glycol solution. The La to Ti mole ratio was one. The disc was then moderately heated to remove the excess glycol and form a resin film which is the lanthanum oxide-titanium citrate-ethylene glycol reaction product.

The temperature was increased to decompose the resin and leave a deposit of $La_2O_32TiO_2$ embedded in the $BaTiO_3$ disc.

Thereafter, the disc was sintered at 1310° C. for about one hour to from a dense ceramic, with the $La_2O_32TiO_2$ going into solid solution with the $BaTiO_3$ over the brushed area. The brushed area is thereby converted to a semiconducting ceramic. Indium-gallium alloy was rubbed over the resistor ends to serve as electrodes. The remaining resistor area was about 0.3 cm. long and about 0.3 cm. wide and had a room temperature resistance of $7\times10^5$ ohms.

Certain organometal compound, e.g., niobium resinate, tantalum resinate, etc., are commercially available. Compounds of this type can also be employed to introduce the metal oxide into the surface of the titanate body. This would be accomplished by dissolving the organometal compound in an appropriate solvent until the proper concentration is obtained. This composition would then be applied to the surface of the titanate piece, for example by silk screening. Thereafter, the solvent would be evaporated and during the firing of the titanate piece the organometal compound would be decomposed to the metal oxide which would go into solid solution with the titanate.

EXAMPLE 2

High purity $BaTiO_3$ prepared as in Example I was pressed in a ½" mold at 25,000 p.s.i. A rectangular area was silk screened over one surface of the disc using the niobium resinate of nonylphenoxyacetic acid dissolved in a terpene base squeegy medium. This composition contained the equivalent of 1 wt. percent $Nb_2O_5$. The disc was moderately heated to remove the solvent and leave the niobium resinate film. The temperature was increased to decompose the resin and form a deposit of $Nb_2O_5$ over the screened area.

After sintering, the disc was about 1 cm. in diameter and 0.05 cm. thick. On one surface of the disc was a blue niobium substituted area 0.6 cm. long and 0.1 cm. wide. Indium-gallium alloy was rubbed over the resistor ends to serve as electrodes. The remaining resistor area was about 1 mm.$^2$.

It was found that the room temperature resistance of this square and the magnitude of the PTC anomaly at the Curie point depended on the firing temperature and time. The table below shows some typical results:

| Firing Temp., ° C. | Firing Time, hr. | Ohms Per Square | | |
|---|---|---|---|---|
| | | 25° C. | 110° C. | 130° C. |
| 1,320 | 1 | $1\times10^3$ | $1.5\times10^3$ | $2.6\times10^3$ |
| 1,370 | 1 | 700 | $1.1\times10^3$ | $3.3\times10^3$ |
| 1,370 | 15 | $2\times10^4$ | $2.5\times10^4$ | $6\times10^6$ |

Figure 3:
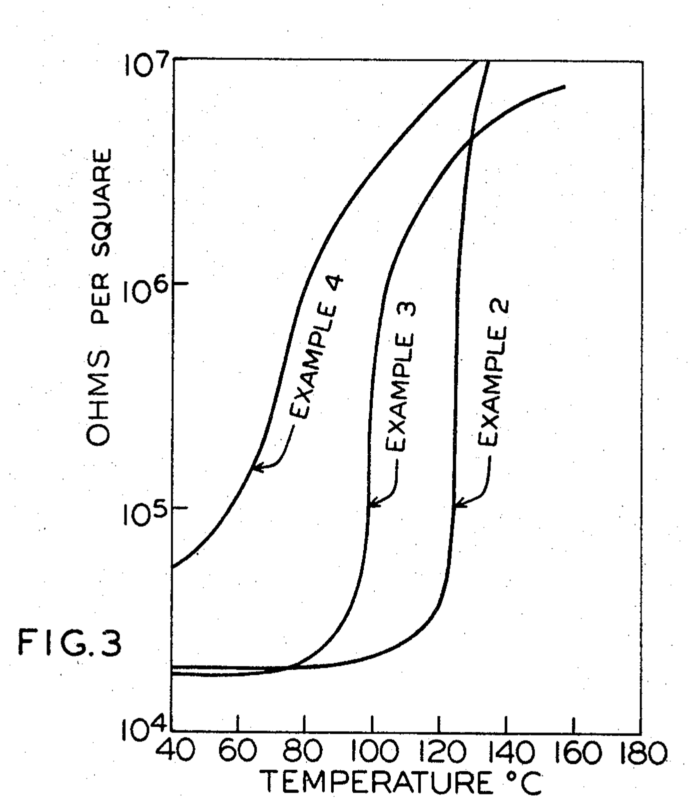
FIGURE 3 are graphs showing the log resistances versus temperature of certain thermistor bodies of the present invention.

A resistance-temperature plot of the sample sintered at 1370 for 15 hours (as shown in FIGURE 3) indicates its suitability for thermistor used despite the diminutive sensing area.

EXAMPLES 3 AND 4

The procedure of Example 1 was repeated to incorporate $Nb_2O_5$ in first a disc of $Ba_{.90}\ Sr_{.10}\ TiO_3$ and then a disc of $Ba_{.80}\ Sr_{.20}\ TiO_3$. Both discs, with the screened on pattern of niobium resinate of nonylphenoxyacetic acid, were sintered at 1370° C. for 15 hours. A blue niobium substituted area 0.6 cm. long and 0.1 cm. wide was formed on one surface of each disc. Indium-gallium alloy was rubbed over the resistor ends to serve as electrodes. The remaining resistor area was about 1 mm.$^2$.

Resistance-temperature plots of the thermistor diffused into the surface of the $Ba_{.90}\ Sr_{.10}\ TiO_3$ disc (Example 3) and of the thermistor diffused into the surface of the $Ba_{.80}\ Sr_{.20}\ TiO_3$ disc (Example 4) are shown in FIGURE 3.

The curves clearly show that the PTC anomaly of the thermistors were shifted to a lower temperature range by the strontium substitutions in the base ceramic. The temperature ranges of the respective units coincide with the Curie point of the base material of the disc. The was determined by a temperature-capacitance plot on the base material containing the surface resistors.

It will be noted that the resistance of the units of the two preceding examples changes to a considerable extent over an extremely narrow temperature range. The units are excellently suited for thermistor use.

Metals capable of forming ions which can enter substitutionally into a cation site of the titanate crystal in a higher valency than the host ion include the Group IIIB, VB and other metals such as antimony and bismuth. For example, instead of lanthanum and niobium organometallic compounds, cerium, yttrium, praseodymium, neodymium, tantalum, etc. organometallic compounds can be employed.

The term organometallic is meant to include compounds in which carbon or oxygen is linked to a metal, for example, as in R-M wherein R is alkyl, aryl or carboxylate and M is a metal of the class previously described.

The indiffused metal oxide must only be capable of entering into a cation lattice site in a higher oxidation state than the host ion. The solution employed must be capable of depositing a continuous film of the organometallic compound that is to be used as the source of the dopant as described above. The organometallic compound is deposited over a selected area of the base and penetrates a small distance beneath the surface. On subsequent pyrolysis, the impurity metal oxide will be formed in a fine state of subdivision firmly imbedded in the selected area and in intimate contact with titanate base material. As such, the oxide particles are well situated to enter into solid solution with the base material at the sintering temperature and form a continuous electroconducting area.

It is important that the solutions employed be free of impurities such as chlorides, sulfates or trace metals that may etch or otherwise contaminate the surface.

As in conventional processes for preparing ceramic semiconductors, the titanate base materials used for this process must be of high purity and preferably of small particle size to enhance reactivity. The surface of the base must be of an absorbent nature to accept the surface dopant. A green compact, formed between 20,000 to 50,000 p.s.i., can be used as such or the compact can be prefired at some low temperature. For example, prefiring the compact for one hour at 1000° C. will produce a disc having good mechanical strength and be sufficiently porous for surface doping. The metal oxide concentrations of the surface dopant can run from 0.5 to 3 wt. percent of the organometallic solution. In other words, the metal oxide equivalent in the solution can be from 0.5 to 3 wt. percent of the solution. The optimum concentration will depend upon the dopant selected, the viscosity of the solution, and to the porosity and preparatory history of the base material.

The metal termination material can be any of the prior art materials which give a low contact resistance. The firing temperature will depend upon the constitution of the basic ceramic but in general will fall between about 1250°–1450° C. for a period of from about 1 to 20 hours.

Since it is obvious that many changes and modifications can be made in the above described details without departing from the nature and spirit of the invention, it is to be understood that the invention is not limited to said details except as set forth in the appended claims.

What is claimed is:

1. A method of forming a positive temperature coefficient electrical resistance device comprising applying to the surface of a porous, green or partially matured ferroelectric metal titanate body in at least one predetermined pattern, a continuous film of an organic solvent-soluble, amorphous organometallic compound, firing said body to decompose the organometallic compound to the metal oxide and cause the oxide to enter the titanate lattice, continuing said firing to mature said body to a dense ceramic so as to form a resistance element having at least one surface coplanar with at least one surface of said titanate body; the metal of said organometallic compound being selected from the class consisting of the Group III–B and Group V–B metals which form ions capable of entering substitutionally into a cation site of the titanate crystal lattice in a higher valency than the host ion and said metal is linked to carbon or oxygen.

2. The method of claim 1 wherein conducting terminations are applied to opposite ends of the resistance pattern.

3. The method of claim 1 wherein said metal titanate is barium titanate.

4. The method of claim 1 wherein said organometallic compound is the niobium resinate of nonylphenoxyacetic acid.

5. The method of claim 1 wherein said organometallic compound is the reaction product of lanthanum oxide dissolved in a titanium citrate-ethylene glycol reaction product after removal of excess ethylene glycol, and wherein the lanthanum to titanium mole ratio is one.

6. The method of claim 1 wherein said porous ferroelectric metal titanate body is in a green state before firing to maturity.

7. The method of claim 1 wherein said porous ferroelectric metal titanate body is in a partially matured state before firing to maturity.

8. A positive temperature coefficient electrical resistance element comprising a dense ferroelectric metal titanate body having at least one electrical resistance element formed therein, said resistance element having at least one surface coplanar with at least one surface of said titanate body, said resistance element consisting essentially of ferroelectric metal titanate crystals having a metal from a precursor of a continuous film of an organic solvent-soluble amorphous organometallic compound substitutionally present therein, said metal being of higher valency than the host ion of said crystals and said metal of higher valency being a member selected from the class consisting of the Group III–B and Group V–B metals, said metal of higher valency being present in a concentration sufficient to convert the ferroelectric to a semiconductor.

9. The resistance device of claim 8 wherein said ferroelectric metal titanate body and said ferroelectric metal titanate crystals are barium titanate.

10. The resistance device of claim 9 wherein said metal of higher valency is a Group III–B metal.

11. The resistance device of claim 9 wherein said metal of higher valency is a Group V–B metal.

12. The resistance device of claim 9 wherein said metal of higher valency is lanthanum.

13. The resistance device of claim 9 wherein said metal of higher valency is niobium.

14. The resistance device of claim 9 wherein said metal of higher valency is cerium.

15. The resistance device of claim 9 wherein said metal of higher valency is yttrium.

16. The resistance device of claim 9 wherein said metal of higher valency is tantalum.

17. The resistance device of claim 9 wherein said metal of higher valency is praseodymium.

18. The resistance device of claim 9 wherein said metal of higher valency is neodymium.

19. The resistance device of claim 9 wherein said resistance element has conducting terminations applied to opposite ends thereof.

References Cited

UNITED STATES PATENTS

| | | | |
|---|---|---|---|
| 3,231,522 | 1/1966 | Blodgett et al. | 338—22 X |
| 2,985,700 | 5/1961 | Johnston | 338—22 |
| 2,976,505 | 3/1961 | Ichikawa | 338—22 |
| 2,855,493 | 10/1958 | Tierman | 201—73 |
| 2,787,560 | 4/1957 | Shaw | 117—229 X |

OTHER REFERENCES

A.P.C. Application of Max Kollmar, Serial #358,184, published May 11, 1943.

ALFRED L. LEAVITT, *Primary Examiner.*

A. M. GRIMALDI, *Assistant Examiner.*

U.S. Cl. X.R.

117—46, 123, 229; 338—308; 106—1